Oct. 14, 1969  F. B. CARDER ET AL  3,472,175

MATERIAL HANDLING SYSTEM AND METHOD

Filed March 21, 1967  6 Sheets-Sheet 1

INVENTORS.
FRANK B. CARDER
ROBERT WRIGHT
GEORGE F. CANADE
DANIEL STEIN

BY:
ATTORNEY.

Oct. 14, 1969     F. B. CARDER ET AL     3,472,175

MATERIAL HANDLING SYSTEM AND METHOD

Filed March 21, 1967     6 Sheets-Sheet 2

INVENTORS.
FRANK B. CARDER
ROBERT WRIGHT
GEORGE F. CANADE
DANIEL STEIN
BY:
ATTORNEY.

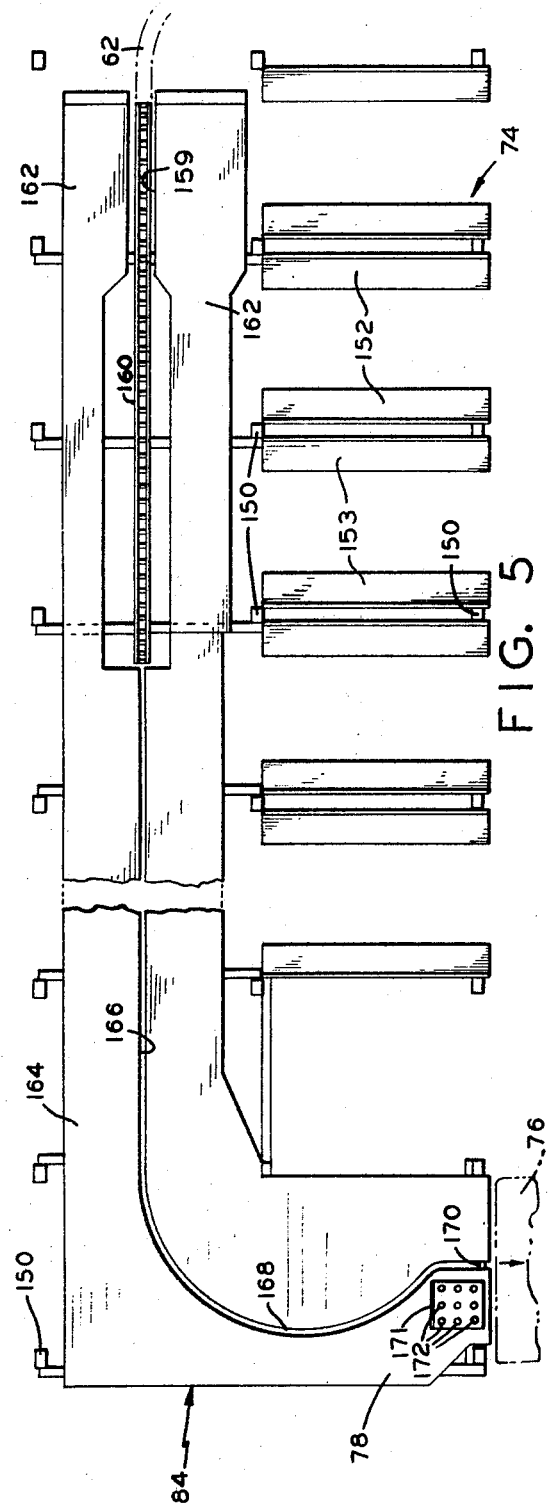
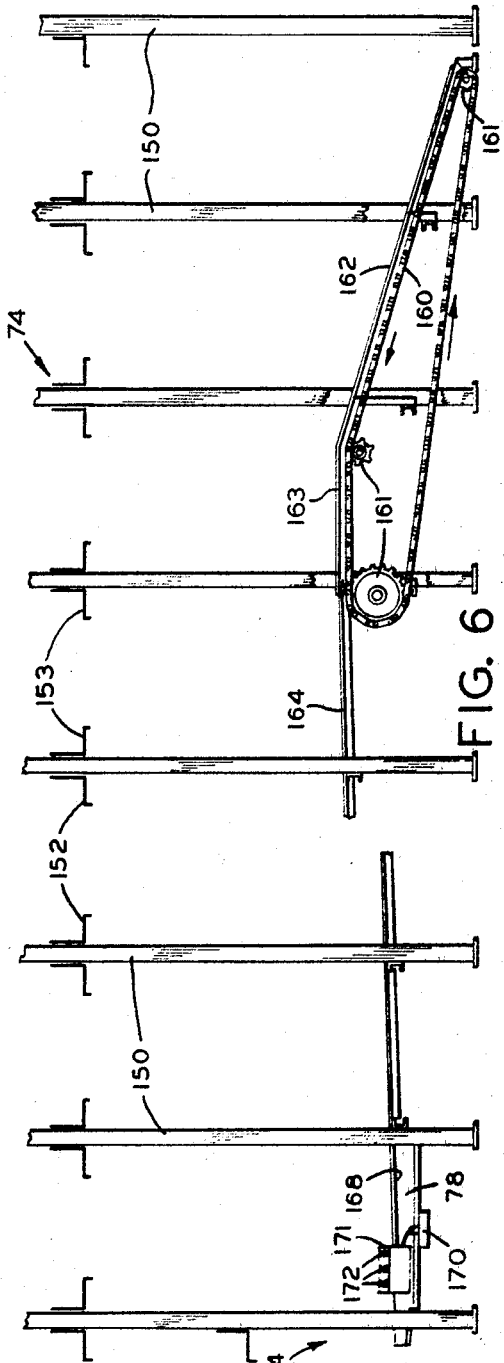

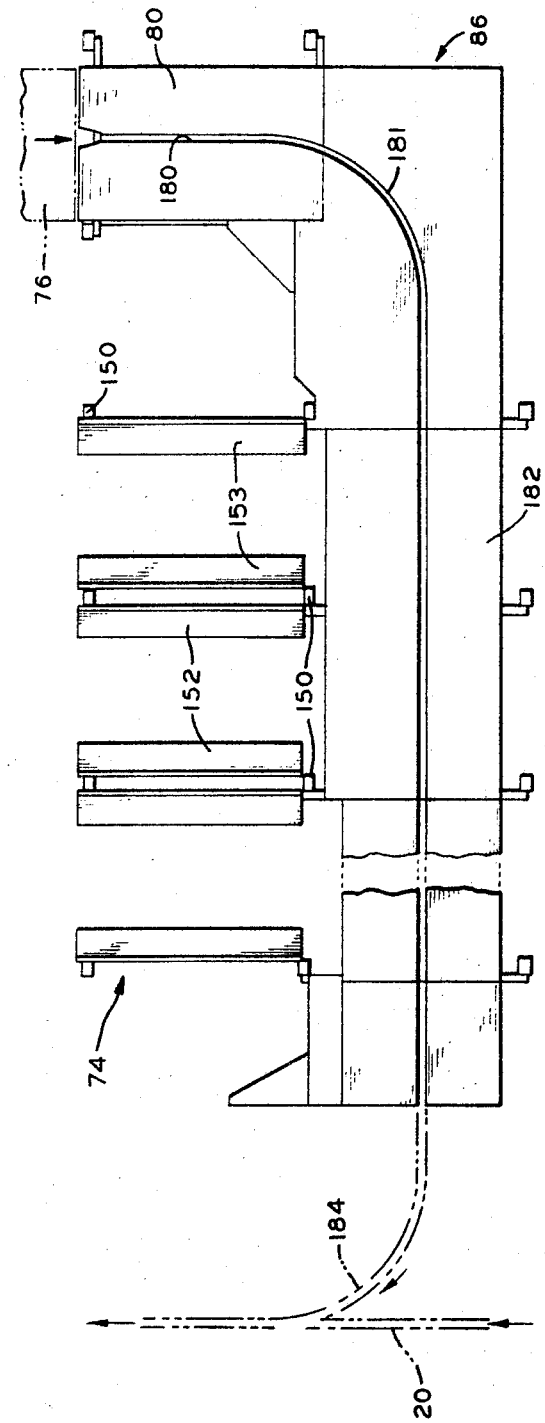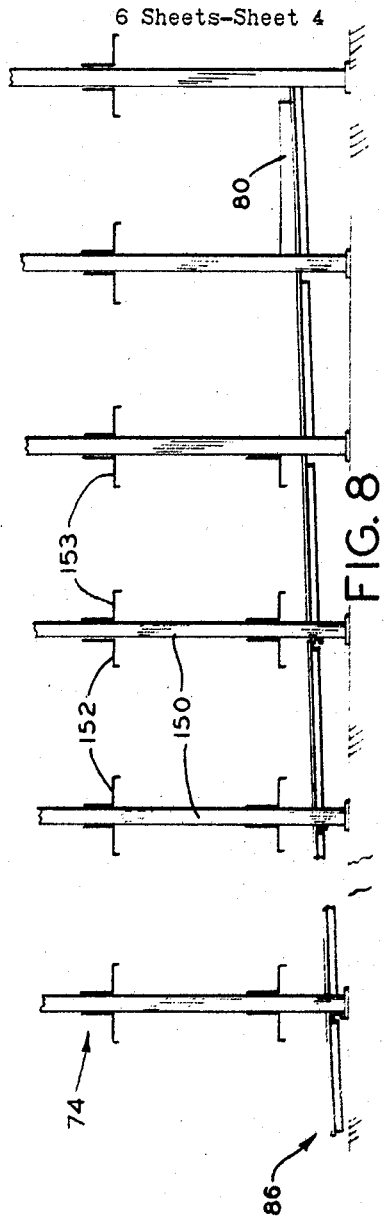

INVENTORS,
FRANK B. CARDER
ROBERT WRIGHT
GEORGE F. CANADE
DANIEL STEIN

ATTORNEY.

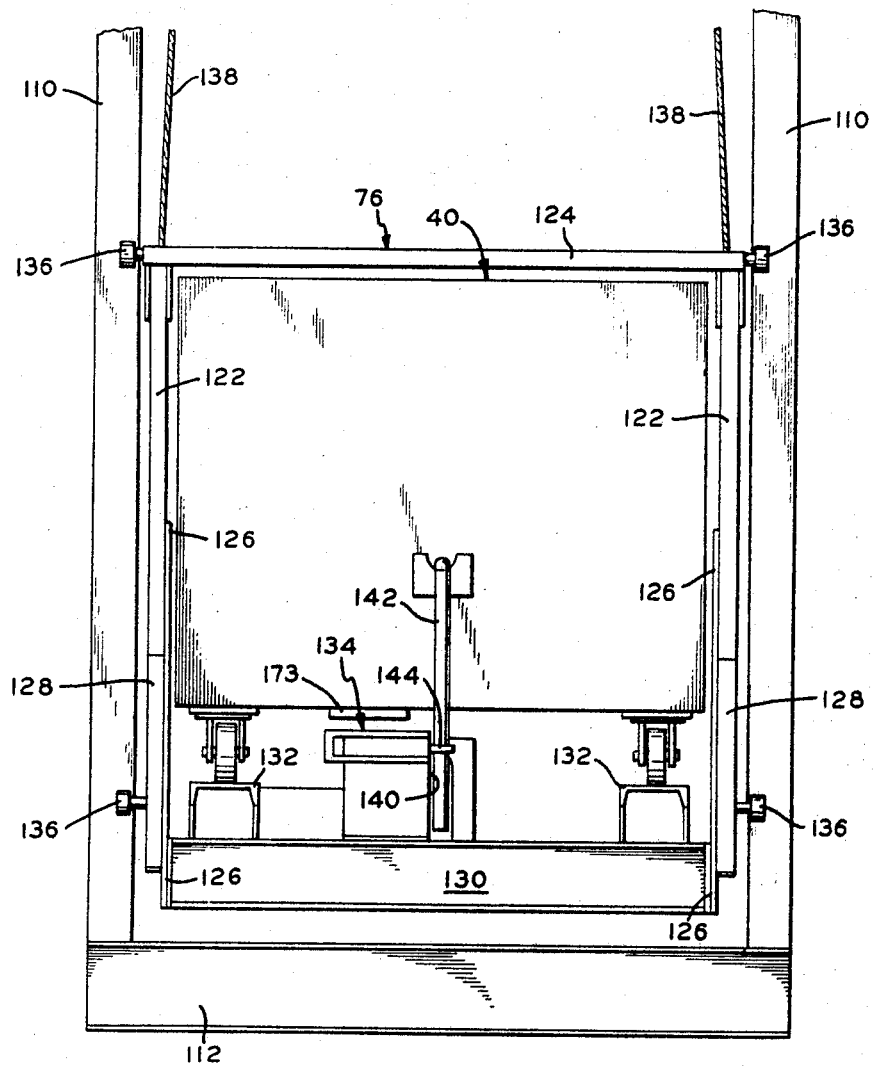
FIG. 10
INVENTORS.
FRANK B. CARDER
ROBERT WRIGHT
GEORGE F. CANADE
DANIEL STEIN
ATTORNEY.

United States Patent Office 3,472,175
Patented Oct. 14, 1969

3,472,175
MATERIAL HANDLING SYSTEM AND METHOD
Frank B. Carder, Darien, Robert Wright, Trumbull, George F. Canade, Norwalk, and Daniel Stein, Newtown, Conn., assignors to Dorr-Oliver Incorporated, Stamford, Conn., a corporation of Delaware
Filed Mar. 21, 1967, Ser. No. 624,860
Int. Cl. B61b 13/00, 1/00; E01b 26/00
U.S. Cl. 104—91        16 Claims

ABSTRACT OF THE DISCLOSURE

A system and method for storing and retrieving material-handling carts of a cart conveying system in storage racks tiered along the aisle of a stacker crane.

BACKGROUND OF THE INVENTION

Materials-handling systems utilizing wheeled carts for containing and automatically transporting various materials or cargo are well known. In certain cart systems, the carts are transported by a tow line running in a predetermined path below the floor level, as exemplarily disclosed in U.S. Patent 2,936,718. In such prior art systems, the wheeled carts have a depending tow pin which is dropped through a guide slot in the floor extending along and above the tow line. Usually carts of this type are manually moved from a loading or unloading point to the tow line where the tow pin is dropped into engagement with lugs on the moving tow chain. The tow line transports the cart to its destination along a predetermined path on the floor.

Storage of cargo-containing and/or empty carts in conventional tow line systems has been accomplished by branch slots or spur lines. Thus, a cart to be stored is switched off the main tow line, automatically in some systems, and routed down the storage spur. Retrieval of the carts from the storage spurs is accomplished manually. However, such prior art cart storage arrangements have been extremely costly in terms of required floor space and in terms of cart-retrieval manpower.

SUMMARY OF THE INVENTION

In view of this prior art situation, it is a primary object of the present invention to provide improved cart storage techniques and apparatus for use in conjunction with cart removing systems.

To accomplish this object, the present invention utilizes a vertical stacking arrangement in conjunction with a cart system thereby minimizing the floor space required for cart storage. The invention includes a stacker crane mounted for horizontal movement in an aisle located between two vertical banks of racks for the storage of carts of the conveying system. An elevator mounted for vertical motion on the stacker crane is uniquely adapted to deliver carts to, and to retrieve carts from, the storage racks. A novel cart inlet mechanism is connected to the cart conveying system so as to transfer carts to be stored from the conveying system and to present them at a position adjacent the crane aisle for pick-up by the elevator. Similarly, for cart retrieval, the stacker has a discharge mechanism which is connected so as to transfer retrieved carts from the elevator back to the conveyor system.

It is frequently preferable to use several of the stackers of the present invention together as a vertical storage block having a sufficiently great capacity to meet the storage requirements of a particular cart conveying system. As fully described below, the individual stackers of the present invention are uniquely adapted to be so blocked together in parallel and contiguous relation for such plural usage.

Other features and objects of the present invention will appear from the following description and the appended claims when read in conjunction with the accompanying drawings.

BRIEF DESCRIPTION OF THE DRAWINGS

FIGURE 5 is a top view of the cart inlet mechanism of one of the stackers of FIGURE 1.

FIGURE 6 is a side view of the apparatus of FIGURE 5 and illustrates the gravity feeding arrangement of the inlet mechanism.

FIGURE 7 is the top view of the cart discharge mechanism of one of the stackers of FIGURE 1.

FIGURE 8 is a side view of the apparatus of FIGURE 7 which shows the gravity transfer arrangement of the discharge mechanism.

FIGURE 10 is a side view from line 10—10 of FIGURE 9 and shows a portion of the stacker crane, the elevator, and a tow cart carried thereby.

DESCRIPTION OF THE INVENTION

Figure 1:
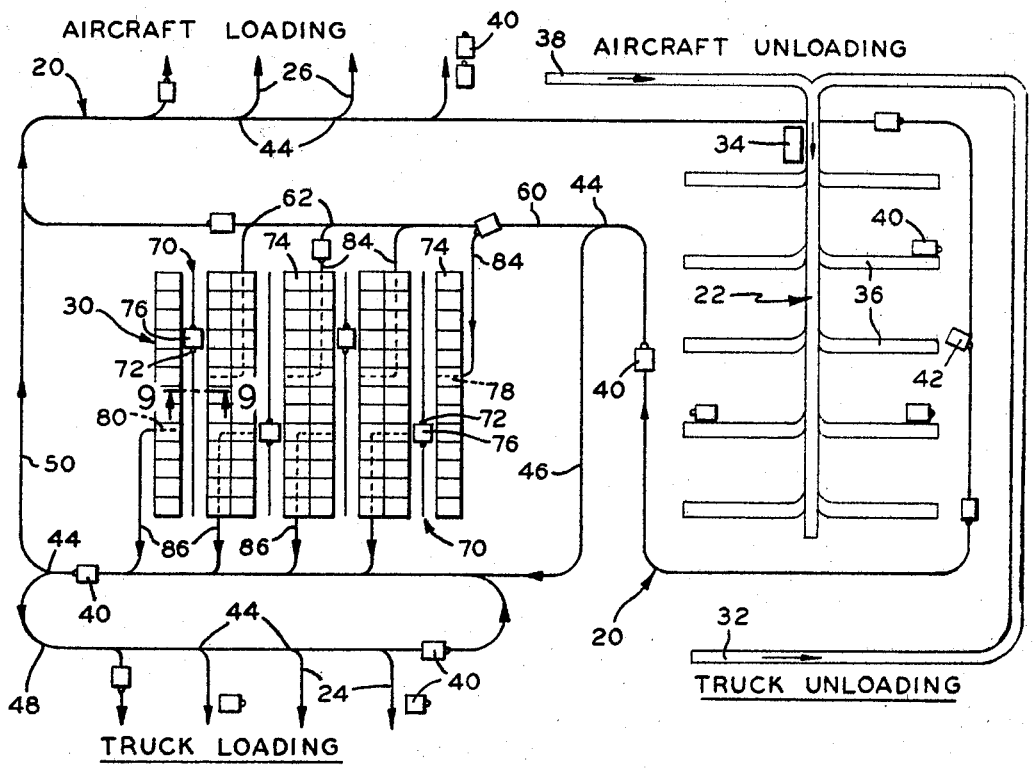
FIG. 1 is a top view of the system of the present invention including the cart towline and the vertical-storage stacker block. The figure shows the invention as exemplarily utilized in the environment of a cargo handling terminal.

Referring to the drawings in greater detail, FIGURE 1 shows the material handling system of the present invention exemplarily utilized in an air cargo terminal. In such a terminal a cart conveying towline 20 and its various spurs are utilized to interconnect the cargo operations and mechanisms located within the terminal. These terminal operations may include a cargo sorting conveyor 22, a land vehicle loading area adjacent to towline spurs 24, an aircraft pallet buildup area adjacent to spurs 26, and a cart storage block 30.

Considering the flow patterns through the terminal, cargo arriving from land vehicles is placed upon a feed conveyor 32. This conveyor moves the cargo or packages past a sorting station 34 which controls the operation of sorting conveyor 22 so as to divert specific packages to designated assignment spurs 36 of the sorting conveyor. Similarly, cargo arriving at the terminal from an aircraft is delivered to a feed conveyor 38, and it also is transported through sorting station 34 to be diverted to designated assignment spurs. The similarly-classified cargo on one assignment spur is loaded into a cart 40 which is then placed in towline system 20 as illustrated at 42 in FIGURE 1.

Carts 40 are towed along the floor of the air terminal in the path of the towline. The carts in conventional manner carry suitable coded information which effects automatic operation of the various switches 44 of the towline so as to direct the cart to its appropriate designation. For example, a tow cart 40 carrying cargo for immediate departure from the air terminal by a land vehicle is switched onto path or slot 46 and subsequently into slot 48. The cart is diverted from slot 48 into a designated land vehicle loading spur 24 in which the cart comes to rest. The cargo is then loaded into an awaiting truck. Empty carts at the land vehicle loading spurs 24 are manually reinserted in towline slot 48 to be returned to the main towline system by way of slot 50.

Similarly, carts carrying cargo destined for a departing aircraft are carried by towline 20 to the aircraft loading area where they are diverted into the designated spur 26. Customarily, the cargo delivered to spurs 20 is transferred onto pallets which are then loaded into the awaiting aircraft.

It is generally necessary for cargo arriving at the terminal from air or land to be stored for some period prior to its departure from the terminal. For this purpose, carts 40 carrying cargo to be stored are delivered to tow slot 60 from which they are diverted at one of the switch spurs 62 into an assigned portion of storage block 30.

Figure 2:
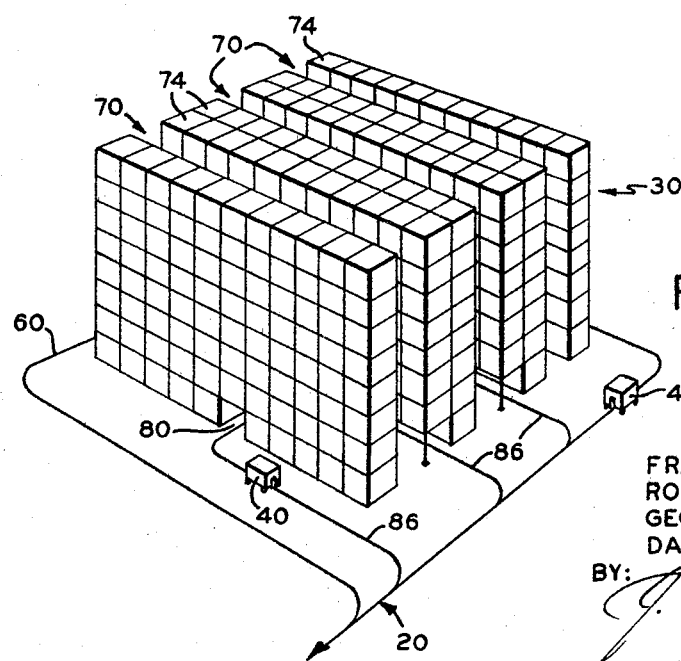
FIGURE 2 is a perspective view of a cart-storing stacker block and a towline system generally similar to FIGURE 1.

In order to provide a storage area which efficiently utilizes available floor space, the present invention utilizes a unique vertical storage mechanism for the carts of the towline. Referring to the schematic illustrations of FIGURES 1 and 2, storage block 30 incorporates a plurality of vertical stackers 70. Each stacker 70 includes a vertically extending crane 72 mounted to traverse horizontally in the path along an aisle between two vertical banks 74 of storage racks, each rack being adapted to receive and store one of the towline carts. An elevator 76 is mounted upon the crane and moves vertically thereon to serve the various levels of storage racks. Additionally, each stacker 70 incorporates a cart inlet station 78 positioned adjacent to the crane aisle so as to present carts to be stored to the elevator for pick up as well as a cart discharge station 80 similarly positioned adjacent the crane aisle. These stations are preferably located in the lower level of the banks of storage racks. Further, an inlet transfer mechanism 84 at each stacker transports carts diverted from towline 20 to inlet station 78 of that respective stacker. A discharge transfer mechanism 86 similarly transports carts from discharge stations 80 back to the towline.

Figure 9:
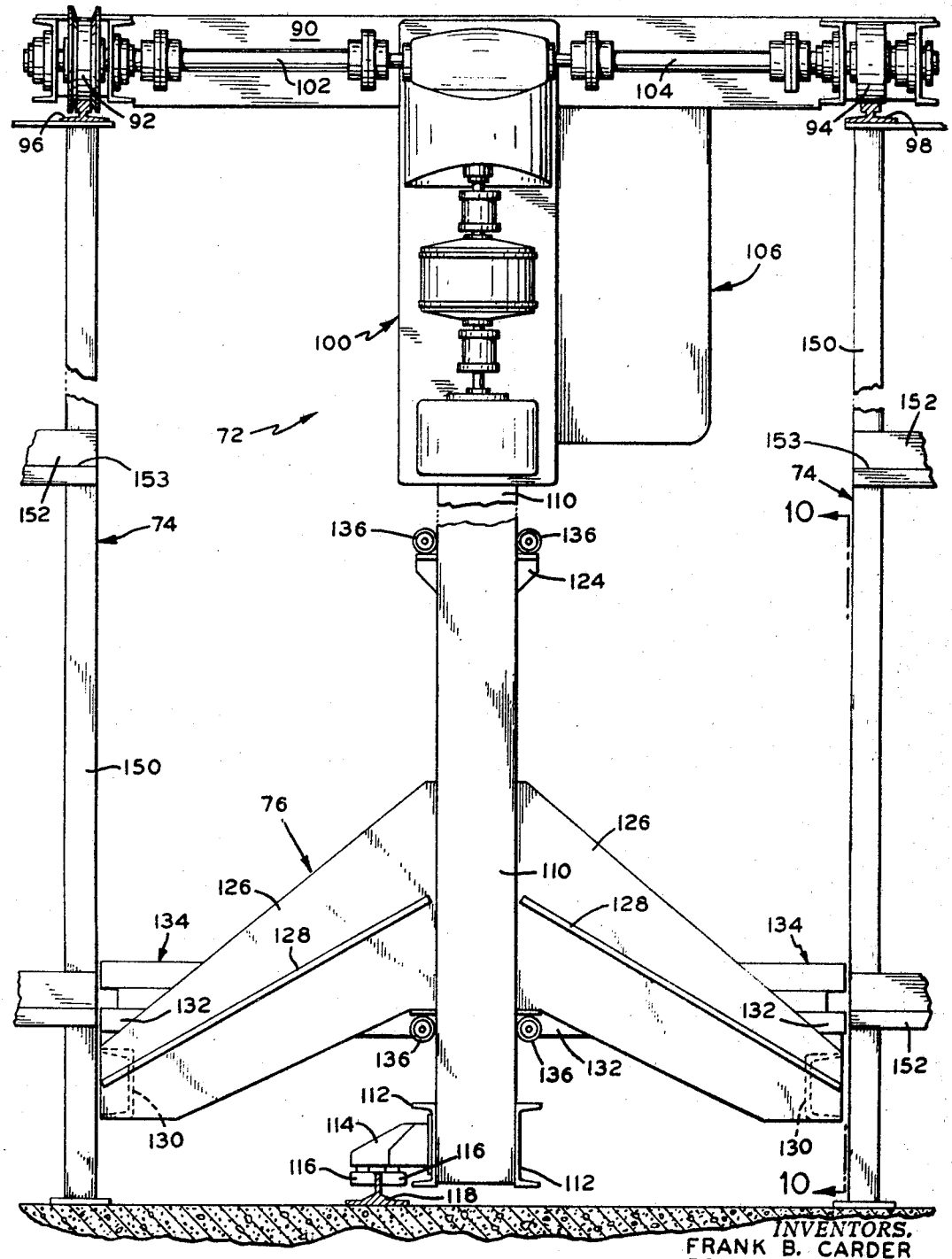
FIGURE 9 is a vertical section taken substantially on line 9—9 of FIGURE 1 and shows the stacker crane and elevator.

Now, considering the various components of stackers 70 in greater detail, FIGURE 9 shows crane 72 positioned in the aisle between opposed storage rack banks 74. Crane 72 includes an overhead chassis 90 having wheels 92 and 94 supported upon overhead rails 96 and 98. The rails extend along either side of the stacker aisle and are supported upon the vertical rack banks 74. Crane chassis 90 also carries a drive mechanism 100 connected to wheels 92 and 94 by shafts 102 and 104 respectively so as to move the crane horizontally along the aisle.

A conventional elevator drive mechanism 106 is also carried by the crane chassis to lift elevator 76 on the crane. Two vertical beams 110 rigidly depend from chassis 90 and are rigidly interconnected at their lower ends by crossbeams 112 to form the vertical elevator guideway on the crane. One of crossbeams 112 carries a framework 114 mounting a pair of rollers 116 which engage opposite sides of a guide track 118 mounted on the floor of the stacker aisle along the length thereof. Guide rail 118 limits the lateral motion of the bottom of the crane to prevent interference between elevator 76 and the rack banks 74.

As shown in FIGURES 9 and 10, elevator 76 which is carried by crane 72 includes an open center framework made up of vertically extending beams 122 (FIGURE 10) which are interconnected across the top of the elevator by a head cross beam 124. Vertical beams 122 carry sideplates 126 which extend outwardly toward either side of the crane aisle from the centrally located beams 122. Side plates 126 are reinforced by stiffening ribs 128 and are interconnected at their lower outboard ends by floor crossbeams 130. Two horizontal beams 132 supporting the wheels of tow carts are mounted transversely to the crane aisle upon floor crossbeams 130. Upper and lower elevator guide rollers 136 are mounted on the elevator and roll on opposite sides of depending guide beams 110 of the crane. Elevator 76 is moved vertically upon crane 72 by support cables 138 which extend up to elevator drive mechanism 106 where they are wound and unwound in conventional manner.

A tow cart extractor 134 is mounted on the elevator transversely to the crane aisle and is supported upon elevator floor crossbeams 130. Extractor 134 provides a slot 140 to guide the depending tow pins 142 of the carts, and it incorporates driving lugs and/or hooks 144 extending across slot 140 so as to engage tow pins 142. Lugs 144 are driven longitudinally along the length of slot 140 by the extractor mechanism so as to move tow carts onto or off of the elevator.

Referring now to FIGURES 5 to 9, the vertically disposed storage rack banks 74 are made up of a plurality of vertically extending columns 150 located at the front and back of the bank. Trackways 152 extend from front to rear of the bank between columns 150 to form the individual racks for the carts. The horizontal portions 153 of trackways 152 serve to support the four wheels of the cart when it is stored in the rack. Preferably, trackways 152 are inclined slightly down from front to back of the rack to insure that stored carts do not accidently roll out into the aisle. During transfer of a cart between a storage rack and the elevator, the wheel supporting beams 132 of the elevator are aligned with and are adjacent to trackways 152 of the rack as shown in FIGURE 9. The cart is moved by extractor 134 onto or off of the elevator with the cart wheels rolling on the aligned supports.

The inlet transfer mechanism 84 which transfers tow carts from switch spurs 62 to the inlet station 78 where they are picked up by elevator car 76 is shown in greater detail in FIGURES 5 and 6. Specifically, tow carts switched off towline 20 for storage are guided along switch spur 62. The carts are moved along spur 62 by their own momentum, or they are pushed by a following tow cart on the main line, a technique which is common in towline systems.

Switch spur 62 guides the cart to a powered tow chain 160 operating in a center line slot 159 provided in an inclined floor or lamp 162 of transfer mechanism 84. Tow chain 160 operates around sprockets 161, one of which is driven, to follow the incline of ramp 162. Tow chain 160 engages the depending tow pin of the cart and the cart is towed up ramp 162 to the high point 163 thereof. From this high point, inlet transfer mechanism 84 continues as a descending ramp 164 and the cart is guided down this ramp by a tow pin slot 166. The carts continue by gravity down ramp 164 making a right angle turn around a curve 168 in slot 166 into inlet station 78 where the cart is halted by an automatic stop 170. Subsequently, when elevator car 76 is positioned adjacent inlet station 78, automatic stop 170 is displaced and the extractor mechanism 134 of the elevator car pulls the car by its tow pin onto the elevator.

In the operation of the materials handling system of the present invention, it may be desirable to have a specific rack in storage block 30 reserved as a "home" for each cart of the towline system. In this manner it is known at all times that a pre-designated rack is available and open for the storage of a specific cart and the cargo therein. Accordingly, when this cargo is required, it can readily be retrieved by extracting the cart and cargo from the pre-designated rack.

In order to insure that each cart is stored in its own rack, the carts carry in conventional towline manner coded information to divert the cart to be stored at the appropriate towline switch 62 to its own stacker 70. Then to effect automatic operation of the stacker so as to place the specific cart in its "home" rack, inlet station 78 incorporates a cart identifying device 171 (FIGURES 5 and 6). This device "reads" a device 173 (FIGURE 10)

carried by the cart for presenting cart identifying information and, through appropriate conventional controls, "instructs" the crane and elevator to insert the identified cart in the rack reserved for it. The identifying device 171 and the cart-carried information 173 are convention devices in and of themselves and are not described in detail herein. Known devices to accomplish this identifying operation operate, for example, on a mechanical, magnetic, or optical presentation of cart identifying information. As schematically shown in FIGURES 5, 6, and 10, device 171 utilizes an array of optical sensors 172 which sense the difference in intensity of light reflected from white and black discs (not shown) mounted on the lower or scanned surface of a plate at 173 carried by the cart. As shown herein, the cart identifying device 171 is located in the inlet station. However, other locations, such as on the elevator are feasible.

Discharge station 80 and discharge transfer mechanism 86 are shown in greater detail in FIGURES 7 and 8. Tow carts being discharged by the extractor mechanism of elevator 76 are guided through discharge station 80 by tow pin slot 180 therein. The cart is then guided through a right angle turn by a curved slot 181 of transfer mechanism 86. Discharge station 80 and a ramp 182 of the transfer mechanism incline downwardly to move the discharged tow carts from the discharge station 80 along ramp 182 to a towline feed spur 184 which joins back into a portion of towline 20.

Figure 4:
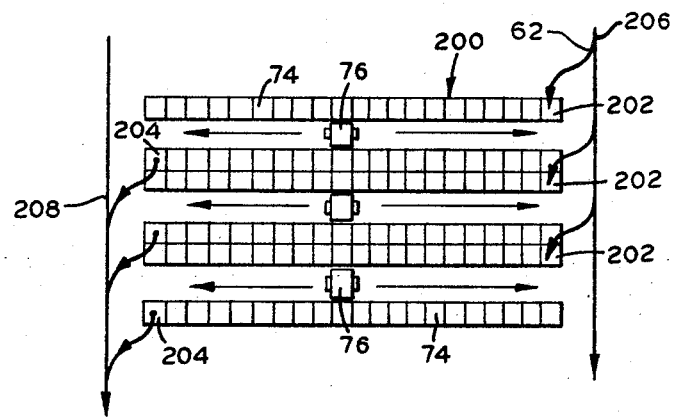
FIGURE 4 is a schematic horizontal section through the lower level of a stacker block according to the present invention showing a modified arrangement of the stacker inlet and discharge mechanisms.

FIGURE 4 shows a modified stacker block embodiment 200. The primary difference between stacker block 200 and the above-described stacker block 30 is the location of the inlet station 202 and the discharge station 204 for each stacker. As shown in FIGURE 4, these stations are positioned on opposite sides of the stacker aisle but at the extreme ends of the aisle adjacent a respective feed portion 206 and discharge portion 208 of the main towline.

Figure 3:
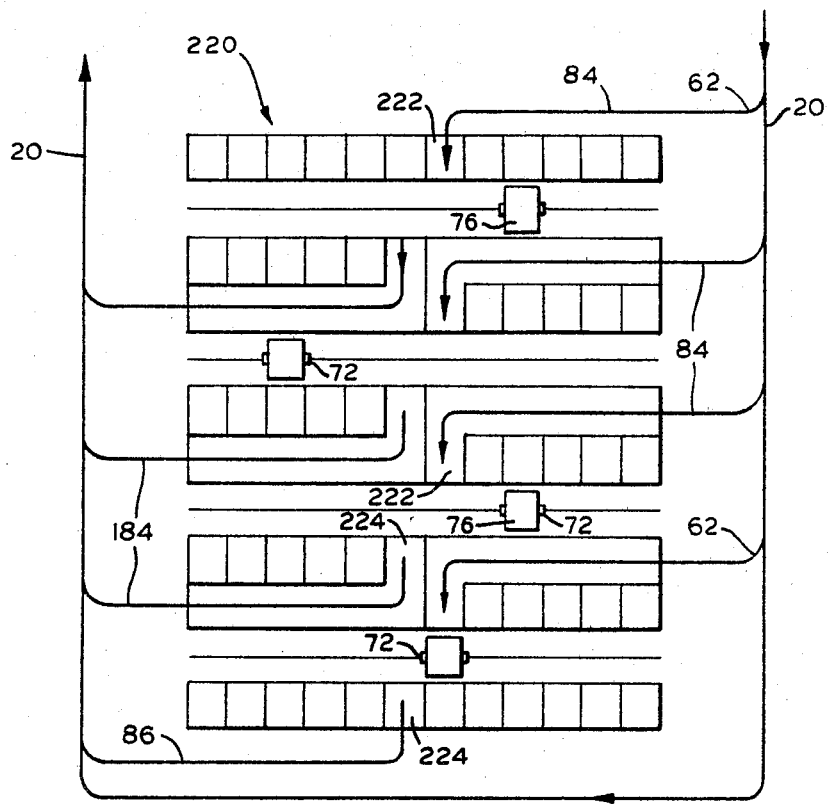
FIGURE 3 is a schematic horizontal section taken through the lower level of a cart-storing stacker block similar to that of FIGURE 1 and shows the interrelationship of the cart-inlet and cart-discharge mechanisms of adjacent stackers in a storage block.

FIGURE 3 shows a modified stacker block 220 generally similar to that of FIGURE 1 wherein the inlet station 222 and the discharge station 224 of each stacker are located on opposite sides of the stacker aisle but at the approximate mid-point of the aisle. In this manner, a more efficient utilization of the stacker crane can be effected since the crane need carry a cart no more than one half the length of the aisle between a cart storage rack and the cart inlet or discharge station.

As shown diagrammatically in FIGURES 1, 3, and 4 and as seen from the structure shown in FIGURES 5 and 7, the inlet transfer mechanism 84 transports carts from the storage switch spur 62 to the stacker inlet station with the longitudinal axis of the cart oriented parallel to the aisle of the stacker. Adjacent the inlet station, inlet transfer mechanism 84 effects a right angle turn of the cart so as to align the cart's longitudinal axis at right angles to the aisle with the front of the cart facing the aisle in a position to be picked up by the elevator. It is to be noted that the inlet transfer mechanism 84 for one stacker 70 is physically disposed within the confines of the adjacent rack bank 74 of the adjacent stacker at the lower levels thereof.

In a similar manner, the cart discharge transfer mechanism 86 receives discharging carts from the elevator "front end first" and effects a right angle turn of the cart as it leaves the cart discharge station. The cart is then transferred frontwards along the length of the discharge transfer mechanism with its longitudinal axis oriented parallel to the aisle of the stacker. Accordingly, cart discharge mechanism 86 is also disposed in the plane of the rack bank of an adjacent stacker. By this technique of utilizing a portion of an adjacent rack bank for the inlet and discharge transfer mechanisms, the present invention permits a nesting or close interfitting of adjacent stackers.

As this invention may be embodied in several forms without departing from the spirit or essential characteristics thereof, the present embodiments are illustrative and not restrictive, the scope of the invention being defined by the appended claims rather than by the description preceding them.

We claim:
1. A materials handling system comprising:
 (a) a wheeled cart conveying system adapted to selectively transport carts along predetermined paths and having a storage path leading away from the cart conveying system and an independent retrieval path leading back to the cart conveying system;
 (b) and a cart storing means for selective storage and retrieval of carts delivered thereto comprising:
  (1) crane means for traversing a path in a horizontal direction,
  (2) cart carrying elevator means mounted for vertical motion on said crane means and having powered means for selectively moving carts onto or off of said elevator means,
  (3) a plurality of cart storage racks disposed in a vertical bank along the crane path for receiving carts delivered by said elevator means,
  (4) a cart inlet station positioned adjacent the crane path and adapted to be connected to said storage path of the conveying system for presenting carts to be stored to said powered cart moving means of the elevator means when the latter is positioned at said inlet station,
  (5) and a cart discharge station positioned adjacent the crane path and adapted to be connected to said retrieval path of said conveying system for returning carts retrieved by said elevator means from said storage racks to said conveying system.

2. A materials handling system as defined in claim 1 including:
 (a) a plurality of said cart storing means adjacent to each other with their respective crane traverse paths oriented in mutually parallel relation, each cart storing means having a bank of said storage racks on either side of the crane path, the back of a rack bank for one cart storing means being substantially contiguous with the back of a rack bank for the adjacent cart storing means;
 (b) first cart transfer means connecting the inlet station of one cart storing means with a storage path of the conveying system, said first cart transfer means traversing from one end of the cart storing means to the inlet station in the plane of the contiguous rack bank of an adjacent cart storing means;
 (c) and second cart transfer means connecting the discharge station of said one cart storing means with a retrieval path of said cart conveying system, said second cart transfer means traversing to the other end of the cart storing means from said discharge station in the plane of the contiguous rack bank of an adjacent storing means.

3. A materials handling system as defined in claim 2 wherein said first and said second cart transfer means respectively traverse in the separate planes of contiguous rack banks of the adjacent cart storing means on the two opposite sides of said one cart storing means.

4. A materials handling system as defined in claim 2 in which said first and said second cart transfer means effect a right angle turn of the carts adjacent the respective inlet and discharge stations whereby the carts are transported along the cart transfer means with the longitudinal cart axis parallel to the crane path and whereby the carts pass through the inlet and discharge stations with the longitudinal axis oriented perpendicularly to the crane path.

5. A wheeled cart storing stacker adapted for plural use in conjunction with a cart conveying system comprising:
 (a) crane means for traversing horizontally in an aisle;
 (b) elevator means carried by said crane means and vertically movable thereon, said elevator means having cart wheel supporting tracks oriented transversely to the crane aisle and having reversible power means for moving carts on said tracks onto or off of said elevator means;

(c) a plurality of cart storage racks tiered on opposite sides of the stacker aisle, each storage rack having tracks oriented transversely to said aisle for supporting and guiding the wheels of stored carts;

(d) a cart inlet station positioned adjacent the crane aisle for presenting carts to be stored to said elevator means with the longitudinal cart axis oriented transversely to the crane aisle;

(e) a cart inlet transfer means for automatically transporting carts to be stored from a position proximate to one end of the aisle to said inlet station;

(f) a cart outlet station positioned adjacent the crane aisle for receiving retrieved carts from said elevator means with the longitudinal cart axis oriented transversely to the crane aisle;

(g) and cart outlet transfer means for automatically transporting carts from said outlet station to a position proximate the other end of the crane aisle.

6. A stacker as defined in claim 5, said storage rack tracks being inclined downwardly away from the crane aisle to retain stored carts against the back of the racks.

7. A stacker as defined in claim 5 wherein said cart inlet transfer means transports carts with the longitudinal cart axis parallel to the crane aisle and then turns the carts through substantially ninety degrees adjacent said inlet station and wherein said cart outlet transfer means turns retrieved carts through substantially ninety degrees adjacent said discharge station and then transports carts away from the discharge station with the longitudinal cart axis parallel to the crane aisle.

8. A stacker as defined in claim 5 wherein said cart inlet transfer means includes an upwardly inclined portion having a powered cart drive to elevate carts to be stored and a downwardly inclined portion for transporting the cart by gravity from said powered portion toward said cart inlet station.

9. A stacker as defined in claim 5 wherein said discharge transfer means includes a downwardly inclined portion for transporting carts by gravity away from said cart discharge station.

10. A stacker as defined in claim 5 wherein said cart inlet transfer means and said cart outlet transfer means are each of sufficient length to accommodate a plurality of carts in a queue along the respective transfer means.

11. A wheeled cart storing stacker adapted for plural use in conjunction with a cart conveying system comprising:

(a) crane means for traversing horizontally in an aisle;

(b) elevator means carried by said crane means and vertically movable thereon, said elevator means having cart wheel supporting tracks oriented transversely to the crane aisle and having reversible power means for moving carts on said tracks onto or off of said elevator means;

(c) a plurality of cart storage racks tiered on opposite sides of the stacker aisle, each storage rack having tracks oriented transversely to said aisle for supporting and guiding the wheels of stored carts;

(d) a cart inlet station positioned adjacent the crane aisle on one side thereof for presenting carts to be stored to said elevator means with the longitudinal cart axis oriented transversely to the crane aisle and with the front of the cart facing the aisle;

(e) a cart inlet transfer means for automatically transporting carts to be stored from a position proximate to an end of the aisle to said inlet station;

(f) a cart outlet station positioned adjacent the crane aisle on the other side thereof for receiving retrieved carts from said elevator means with the cart front facing away from the crane aisle when the cart is in the outlet station;

(g) and cart outlet transfer means for automatically transporting carts from said outlet station to a position proximate an end of the crane aisle.

12. A method of storing and retrieving carts of a cart conveying system comprising the steps of:

(a) diverting a selected cart to be stored from the conveying system;

(b) transporting the diverted cart frontwards and longitudinally along a predetermined inlet path to an inlet space;

(c) extracting the cart longitudinally from the inlet space into a first position in a vertical, generally planar aisle space oriented substantially at right angles to the longitudinal axis of the cart in the inlet space;

(d) translating and elevating the extracted cart to a second position in the aisle space horizontally and/or vertically removed from said first position;

(e) inserting the cart longitudinally into a storage space adjacent the second position;

(f) subsequently extracting the cart longitudinally from the storage space into the aisle space;

(g) translating and elevating the cart to a third position horizontally and/or vertically removed from the second position;

(h) inserting the retrieved cart longitudinally into a discharge space adjacent the third position;

(i) and transporting the retrieved cart frontwards and longitudinally along a predetermined discharge path back to the conveying system.

13. A method as defined in claim 12, said step of transporting the diverted cart being performed along an inlet path oriented generally parallel to the aisle space on one side thereof and said step of transporting the retrieved cart being performed along a discharge path oriented generally parallel to the aisle space and on the other side thereof.

14. A method as defined in claim 13 wherein said two steps of transporting carts each include the respective steps of effecting a substantially right angle turn of the cart adjacent the respective inlet and discharge spaces.

15. A method as defined in claim 13 wherein said two respective transporting steps are performed in the same direction along the respective and parallel inlet and discharge paths.

16. A method of storing carts of a cart conveying system comprising the steps of:

(a) diverting a selected cart to be stored from the conveying system;

(b) transporting the diverted cart along an inlet path to an inlet space;

(c) sensing cart carried information which specifically identifies the cart to be stored;

(d) extracting the cart from the inlet space into a first position in a vertical, generally planar aisle space;

(e) translating and elevating the extracted cart to a second position in the aisle space adjacent a storage space reserved for the specific identified cart;

(f) and inserting the cart into the reserved storage space.

References Cited
UNITED STATES PATENTS

| | | | |
|---|---|---|---|
| 2,693,770 | 11/1954 | Hubscher | 104—35 |
| 2,799,231 | 7/1957 | Temple | 104—178 |
| 2,865,489 | 12/1958 | Oshanyk | 104—178 |
| 3,357,367 | 12/1967 | Etheridge | 104—178 |
| 3,357,539 | 12/1967 | Naslund | 104—88 |
| 3,380,396 | 4/1968 | Willis | 104—178 |

ARTHUR L. LA POINT, Primary Examiner

D. F. WORTH III, Assistant Examiner

U.S. Cl. X.R.

104—172